United States Patent
Suzuki

(12) 
(10) Patent No.: US 6,343,865 B1
(45) Date of Patent: Feb. 5, 2002

(54) NON-GLARE FILM, POLARIZING DEVICE AND DISPLAY DEVICE

(75) Inventor: Hiroko Suzuki, Shinjuku-ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 09/244,574

(22) Filed: Feb. 10, 1999

(30) Foreign Application Priority Data

Feb. 17, 1998 (JP) .......................................... 10-034370

(51) Int. Cl.[7] .............................................. G02B 27/00
(52) U.S. Cl. ..................... 359/601; 359/603; 359/608; 359/609; 359/613
(58) Field of Search .............................. 359/601, 603, 359/608, 609, 613, 483, 493, 580, 581, 582, 586, 589; 358/252

(56) References Cited

U.S. PATENT DOCUMENTS 6,067,133 A * 5/2000 Niibori et al. ................. 349/60
6,143,418 A * 11/2000 Takamiya et al. ........... 428/434

FOREIGN PATENT DOCUMENTS

| JP | A-6-18706 | 1/1994 |
| JP | A-8-94806 | 4/1996 |
| JP | A-10-20103 | 1/1998 |

* cited by examiner

*Primary Examiner*—Mohammad Sikder
(74) *Attorney, Agent, or Firm*—Oliff & Berridge, PLC

(57) ABSTRACT

A non-glare film 10 is composed of a non-glare layer 18 formed by coating a transparent base film 12 of TAC or the like with a coating material obtained by mixing a light transmissive diffusing material 14 of resin beads and the like in a light transmissive resin 16, and a low refractive index layer 20 composed of a silicon-containing vinylidene fluoride copolymer, said low refractive index layer 20 being laminated onto the surface of the non-glare layer, in which the haze value on the surface of the non-glare layer 18 is 7 to 30 and the haze value inside the non-glare layer 18 is 1 to 15, and when the non-glare film is attached onto the surface of a display panel, it suppresses degradation in contrast and furthermore prevents face-glare, reflecting-in and whitening.

23 Claims, 4 Drawing Sheets

NON-GLARE FILM, POLARIZING DEVICE AND DISPLAY DEVICE

BACKGROUND OF THE INVENTION

1. Field of the Invention

The present invention relates to a non-glare film and a polarizing device to be preferably used on the surface of a high-resolution image display such as a cathode ray tube (CRT), a liquid crystal panel and the like to be used in an image display of a word processor, a computer, a television and the like, and a display device using the same non-glare film or polarizing device.

2. Related Art

In a display as described above, when a light emitted mainly from the inside comes straight on without diffusing on the display surface, a viewer of the display surface feels dazzling. In order to prevent this, the display surface is provided with a non-glare film for diffusing a light emitted from the inside to some degree. Such a non-glare film is formed by coating the surface of a transparent base film with a resin containing a filler such as silicon dioxide (silica) and the like, as disclosed, for example, in Japanese Patent Laid-Open Publication No. Hei 6-18706, Japanese Patent Laid-Open Publication No. Hei 10-20103 and the like.

These non-glare films include a type of forming a rugged shape on the surface of a non-glare layer by cohesion of particles of cohesive silica and the like, a type of forming a rugged shape on the surface of a layer by adding into a resin an organic filler having a particle diameter larger than the thickness of a coating film, and a type of transferring a rugged shape by laminating a rugged film onto the surface of a layer.

Any type of conventional non-glare films as described above obtains a light diffusing and glare preventing action by action of the surface shape of a non-glare layer and in order to enhance its glare preventing ability it is necessary to enlarge said rugged shape, but there is a problem that enlarging the ruggedness raises the haze value of a coating film and this causes deterioration in sharpness of an image.

As a film similar to the films described above, a light diffusion film obtaining a light dispersion effect by dispersing fine particles inside a layer has been disclosed in Technical Report MD-96-48 (1996), pp.277 to 282, of The Illuminating Engineering Institute of Japan, for example, as a film for a reflection-type liquid crystal display device.

In order to obtain a sufficient light diffusion effect from an internal scattering effect of a light diffusion film used here, the diameter of particles used needs to be made large, and doing so causes a problem that an area having a high haze value of the surface of a reflection-type liquid crystal display device is very poor in sharpness of an image.

And in case of using such a non-glare film obtaining a light diffusion effect by an internal scattering effect as said light diffusion film on the surface of a display, there is also a problem that it is not possible to prevent an external light from being reflected in the surface of the display due to a fact that the surface of it is almost flat.

Furthermore, a non-glare film of a conventional type as described above has a problem that the visibility of a display screen is degraded due to occurrence of glittering called face-glare (scintillation) on the surface of a, film.

A haze value is used as one of criteria for evaluating such a non-glare film, and there is a problem that lowering the haze value of a surface makes glare feeling called face-glare stronger and raising the haze value to solve this makes an image whitish as a whole and lowers it in black density and thereby degrades the image in contrast. On the other hand, when lowering the haze value to remove the whitishness, a problem happens that what is called reflecting-in and glare feeling result in increasing.

SUMMARY OF THE INVENTION

The present invention has been performed in consideration of the above-mentioned existing problems, and an object of the invention is to provide a non-glare film capable of suppressing degradation of contrast and preventing face-glare, reflecting-in and whitening when it is attached onto a display surface, and a polarizing device using the same film and a display device using the same non-glare film or polarizing device.

The present invention is based on the knowledge that in case of forming a non-glare film by laminating a non-glare layer composed of a light transmissive resin containing a light transmissive diffusing material having a refractive index different from the light transmissive resin, when the surface haze value to of the rugged surface of the non-glare layer meets "7<hs<30" and the internal haze value hi by internal diffusion of said non-glare layer meets "1<hi<15", it is possible to make small the particle diameter of the light transmissive diffusing material and make better the display quality of, for example, a liquid crystal display and the like.

The present invention attains the above-mentioned object by a non-glare film which has a non-glare layer laminated onto at least one of the surfaces of a light transmissive base film, said non-glare layer comprising a light transmissive resin containing a light transmissive diffusing material being different in refractive index from the light transmissive resin, wherein the surface haze value hs on a rugged surface of this non-glare layer meets "7<hs<30" and the internal haze value hi by internal diffusion of said non-glare layer meets "1<hi<15".

And said non-glare layer may have further a low refractive index layer laminated onto said non-glare layer, said low refractive index layer being lower in refractive index than said non-glare layer.

Moreover, said low refractive index layer may be formed out of a silicon-containing vinylidene fluoride copolymer.

And said silicon-containing vinylidene copolymer may be a polymer composed of a fluorine-containing copolymer which is a copolymer of vinylidene fluoride and hexafluoropropylene and whose fluorine content is 60 to 70 wt %, and a polymeric compound having an ethylene-unsaturated group.

And furthermore, said low refractive index layer may be formed by being coated with a coating film composed of at least said fluorine-containing copolymer and a polymeric compound having said ethylene unsaturated group and then being irradiated with an active energy beam or being heated.

And said low refractive index layer may be formed out of a silicon oxide film have a contamination preventing layer formed on it.

The sum of the surface haze value hs of the rugged surface of the non-glare layer in said non-glare film and the internal haze value hi caused by internal diffusion in said non-glare layer may be equal to or less than 30.

And the difference $\Delta n$ in refractive index between the light transmissive resin and the light transmissive diffusing material in said non-glare layer may meet "$0.01 \leq \Delta n \leq 0.5$" and the average particle diameter d of the light transmissive diffusing material may meet "$0.1\ \mu m \leq d \leq 5\ \mu m$".

And the light transmissive resin in said non-glare layer may be at least one of a thermosetting resin and an ionizing-radiation hardening resin, and said light transmissive diffusing material may be a type of organic fine particles.

And said organic fine particles may be styrene beads.

The transparent base film in said non-glare film may be formed out of one of a triacetate cellulose film and a polyethylene terephthalate film.

And a transparent conductive layer may be put between the transparent base film and the non-glare layer, and a conductive material may be contained in the non-glare layer.

The present invention related to a polarizing device attains the above-mentioned object by a polarizing device comprising one of said non-glare films and a polarizing plate which is laminated onto the opposite surface of said transparent base film to said non-glare layer of this non-glare film so as to direct its observe surface face to the said opposite surface to said non-glare layer side.

And it is allowable to apply a saponification process to the opposite surface of said transparent base film to said non-glare layer and the surface of said non-glare layer and then laminate a polarizing plate onto the surface of said transparent base film.

The present invention related to a display device attains the above-mentioned object by a display device comprising a display panel which has a plurality of pixels and forms an image by a fact that each pixel transmits or reflects light, and one of said non-glare films provided on the display surface of this display panel.

And the present invention attains the above-mentioned object by a display device comprising a display panel which has a plurality of pixels and forms an image by a fact that each pixel transmits or reflects light, and a polarizing device as described above which is provided on the display surface of this display panel.

DETAILED DESCRIPTION OF THE PREFERRED EMBODIMENTS

Embodiments of the present invention are described in detail with reference to the drawings in the following.

Figure 1:
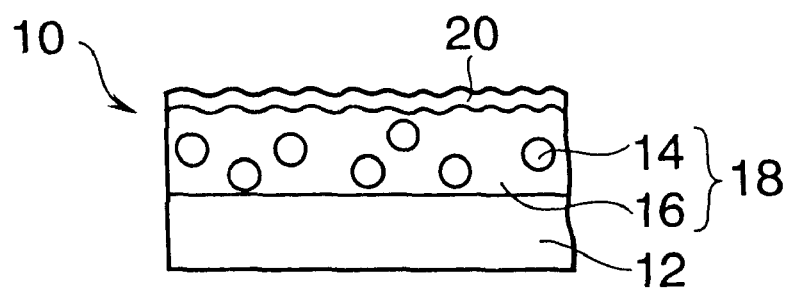
FIG. 1 is a sectional view showing a non-glare film according to a first embodiment of the present invention.

As shown in FIG. 1, a non-glare film 10 according to a first embodiment of the present invention has a non-glare layer 18 laminated onto one (the upper surface in the figure) of the surfaces of a transparent base film 12, said non-glare layer 18 comprising a light transmissive resin 16 containing a light transmissive diffusing material 14 being different in refractive index from the light transmissive resin 16, and has a low refractive index layer 20 laminated outside of it, wherein the surface haze value hs on the rugged surface of said non-glare layer 18 meets "7<hs<30" and the internal haze value hi by internal diffusion of said non-glare layer 18 meets "1<hi<15".

The low refractive index layer 20 has little influence on the haze value of the surface of the non-glare layer 18 if it has a material and film thickness within an ordinary range where it can reveal an antireflective action.

In a liquid crystal display device and the like, the lower the haze value of the surface of a non-glare layer 18 adhered onto the surface of a display panel is, the sharper and clearer an image obtained on the display panel is, but if the haze value is too low a reflecting-in phenomenon and a face-glare phenomenon occurs on the surface of the display panel and if it is too high a whitening phenomenon happens (whitening; degradation in black density), and therefore, in order to reduce these phenomena, the surface haze value hs of the non-glare layer 18 meets preferably "7<hs<30", more preferably "$8 \leq hs \leq 20$", and the most preferably "$8 \leq hs \leq 15$". And even if the haze value hs of the non-glare layer 18 made optimal, when the internal haze value hi is low, a face-glare phenomenon is liable to happen, but by making the internal haze value hi meet preferably "1<hi<15", more preferably "$2 \leq hi \leq 15$", and the most preferably "$3 \leq hi \leq 12$", a face-glare phenomenon could be reduced. And when the sum of both of the surface haze value and the internal haze value of the non-glare layer 18 was made 30 or less, degradation in black density (contrast) could be prevented.

As described above, the present invention obtains a desired effect by using jointly a surface diffusion and an internal diffusion of the non-glare layer 18, and can obtain a better effect by forming the non-glare layer 18 so that the sum of the surface haze value hs and the internal haze value hi becomes a specific value as described above. At this time, a proper degree of ruggedness can be usually provided on the surface of a resin layer by means of fine particles contained in the non-glare layer 18, and this is a preferable embodiment.

A rugged surface can be also formed by coating a transparent base film 12 with a light transmissive resin 16 having a light transmissive diffusing material 14 mixed in it, laminating a molding film having a finely rugged surface of 1.2 $\mu$m or less in surface roughness Ra onto this coating layer so that the said finely rugged surface comes into contact with said coating layer, and irradiating it through the molding film with electron beams or ultraviolet rays in case that said light transmissive resin 16 is an electron-beam hardening resin or an ultraviolet-rays hardening resin, or heating it to harden in case that said resin 16 is a solvent drying resin, and then exfoliating the molding film from the hardened non-glare layer 18.

By doing so, a fine ruggedness being 1.2 $\mu$m or less in surface roughness Ra which has been formed in advance on the molding film is formed on the non-glare layer 18.

In order to do as described above, in the above-mentioned embodiment, a refractive index difference $\mu$n between the light transmissive resin 16 and the light transmissive diffusing material 14 which form the non-glare layer 18 is set as "0.01≦μn≦0.5, and the average particle diameter d of the diffusing material 14 is set as "0.1 μm≦d≦5 μm".

The reason why the refractive index difference Δn is set as 0.01 or more is that when it is less than 0.01 a very large amount of diffusing material must be contained in the light transmissive resin in order to reveal a light diffusing ability in the non-glare layer 18, and doing so deteriorates the adhering ability and the coating ability of the non-glare layer 18 to the transparent base film 12, and in case that Δn is greater than 0.5 the amount of the light transmissive diffusing material 14 contained in the light transmissive resin 16 is too little to obtain a non-glare layer 18 having a uniform and properruggedness.

In case that the average particle diameter d of the light transmissive diffusing material 14 is less than 0.1 μm it is difficult for the light transmissive diffusing material 14 to disperse into the light transmissive resin 16 and it is not possible to form a non-glare layer 18 having a uniform and properruggedness due to cohesion of the light transmissive diffusing material 14, and in case of "d>5 μm", the internal haze value is lowered and face-glare results in occurring due to reduction of a diffusing effect inside the non-glare layer 18. Additionally, since the non-glare layer 18 becomes thicker in film thickness, a hardening shrinkage of the light transmissive resin 16 in a manufacturing process is increased and causes crack or curl.

And it is based on the knowledge obtained by the experiments by the inventors (see embodiments and tables described later) that the surface haze value and the internal haze value of said non-glare layer 18 have been determined as described above. And the haze values as described above can be concretely obtained by adjusting a filler to binder ratio which is the ratio of the light transmissive diffusing material 14 to the light transmissive resin 16, a solvent and the like.

A material for said transparent base film 12 includes a transparent resin film, a transparent resin plate, a transparent resin sheet, and a transparent glass plate.

As a transparent resin film, can be used a triacetate cellulose (TAC) film, a polyethylene terephthalate (PET) film, a diacetyl cellulose film, an acetate butylate cellulose film, a polyether sulfone film, a polyacryl-based resin film, a polyurethane-based resin film, a polyester film, a polycarbonate film, a polysulfone film, a polyether film, a polymethylpentene film, a polyether ketone film, a (meth)acrylonitril film, and the like. And the thickness of it is set ordinarily as 25 μm to 1000 μm or so.

As a material for said transparent base film 12, TAC is particularly preferable for a liquid crystal display device, since it does not have birefringence and makes it possible to laminate a non-glare film and a polarizing device to each other (described later) and furthermore can provide a display device being excellent in display quality using the non-glare film.

And PET is particularly preferable as a material for the transparent base film 12 from a viewpoint of thermal resistance, solvent resistance, machinablity, mechanical strength and the like in case of coating the non-glare layer 18 by means of various kinds of coating methods.

As a light transmissive resin 16 forming said non-glare layer 18, three kinds of resins including a resin hardened mainly by ultraviolet rays or electron beams, namely, an ionizing-radiation hardening resin, a mixture of an ionizing-radiation hardening resin with a thermosetting resin and a solvent, and a thermosetting resin are used.

As a coat forming component of an ionizing-radiation hardening resin composition, can be preferably used a material containing a comparatively large amount of an acrylate-based functional group such as comparatively low molecular weight polyester resins, polyether resins, acryl resins, epoxy resins, urethane resins, alkyd resins, spiroacetal resins, polybutadiene resins, polythiolpolyene resins, and oligomers or prepolymers of (meth)acrylate or the like of multifunctional compound of polyhydric alcohol or the like, and as a reactive diluent, can be used a diluent containing a comparatively large amount of monofunctional monomer such as ethyl(meth)acrylate, ethyl hexyl (meth)acrylate, styrene, methyl styrene, N-vinyl pyrrolidone or the like, and of multifunctional monomer such as polymethylol propane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1, 6-hexanediol di(meth)acrylate, neopentyl glycol di(meth)acrylate or the like.

Moreover, in order to make said ionizing-radiation hardening resin composition into an ultraviolet-radiation hardening resin composition, in the ionizing-radiation hardening resin, may be mixed a kind of acetophenone, a kind of benzophenone, Michiler's benzoyl benzoate, α-amyloxyme ester, tetramethylthiurammonosulfide, a kind of thioxanthone or the like as a photo-polymerization initiator, and may be mixed n-butylamine, triethylamine, poly-n-butyl phosphine or the like as a photo-sensitizer. In the present invention, particularly, it is preferable to mix urethane acrylate as oligomer and dipentaerythritol hexa(meth)acrylate or the like as a monomer.

Moreover, as a light transmissive resin 16 for forming said non-glare layer 18, an ionizing-radiation hardening resin may contain a solvent drying resin. As said solvent drying resin, a thermoplastic resin is mainly used. A kind of solvent drying thermoplastic resin to be added to an ionizing-radiation hardening resin is what is ordinarily used, but particularly in case of using a cellulose-based resin such as TAC or the like as described above as the transparent base film 12, a cellulose-based resin such as nitrocellulose, acetyl cellulose, cellulose acetate propionate, ethyl hydroxyethyl cellulose, and the like are more advantageous from a viewpoint of adhesion and transparency of the coat as a solvent drying resin to be contained in an ionizing-radiation hardening resin.

The reason is that in case of using toluene as a solvent for said cellulose-based resin, although toluene which is a solvent ineffective to polyacethylcellulose forming the transparent base film 12 is used, it is possible to improve adhesion of the transparent base film 12 to the coating resin even by applying a coating material containing this solvent drying resin to the transparent base film 12, and furthermore since this toluene does not dissolve the polyacethyl cellulose forming the transparent base film 12, there is an advantage that the surface of said transparent base film 12 is not whitened and the transparency of it is kept.

Additionally, adding a solvent drying resin to an ionizing-radiation hardening resin composition will bring a benefit as described below.

In case of applying an ionizing-radiation hardening resin composition to a transparent base film 12 by means of a roll coater having a metalling roll, a liquid residual resin film on the surface of the metalling roll flows to form stripes and spots with the lapse of time and these are transferred back on to the coated surface to cause such defects as stripes, spots and the like on the coated surface, but such coating defects on the coated surface can be prevented by adding a solvent drying resin to the ionizing-radiation hardening resin composition as described above.

An ionizing-radiation hardening resin as described above can be hardened by a common hardening method as a method for hardening said ionizing-radiation hardening resin composition, namely, by irradiation of electron beams or ultraviolet rays.

Electron beams or the like having energy of the order of KeV are used and in case of ultraviolet-radiation hardening, ultraviolet rays and the like emitted from a super high voltage mercury lamp, a high voltage mercury lamp, a low voltage mercury lamp, a carbon arc, a xenon arc, a metal halid lamp and the like can be utilized.

As a thermoplastic resin to be mixed in said ionizing-radiation hardening resin, can be used a phenol resin, a urea resin, a diarylphthalate resin, a melamine resin, a guanamine resin, an unsaturated polyester resin, a polyurethane resin, an epoxy resin, an aminoalkyd resin, a melamine-urea co-condensed resin, a silicon resin, a polysiloxane resin and the like, and according to need, these resins are used in combination with a bridging agent, a hardener such as a polymerization initiator and the like, a polymerization accelerator, a solvent, a viscosity adjuster and the like.

As a light transmissive diffusing material 14 to be contained in said non-glare layer 18, plastic beads are preferable, and plastic beads being high in transparency and having a refractive index value which is so different as described above from that of a matrix resin (light transmissive resin 16) are particularly preferable.

As plastic beads, styrene beads (1.59 in refractive index), melamine beads(1.57 in refractive index), acryl beads (1.49 in refractive index), acryl-styrene beads(1.54 in refractive index), polycarbonate beads, polyethylene beads, polyvinyl chloride beads and the like are used. Among these plastic beads, beads being 0.1 to 5 μm in particle diameter are selected to be used as described above. Among these beads, styrene beads are preferably used in particular.

In case of adding a light transmissive diffusing material 14 as an organic filler as described above, since the organic filler is liable to sediment in a resin composition (light transmissive resin 16), such an inorganic filler as silica or the like may be added. The more inorganic filler is added, the more effective it is in order to prevent sedimentation of the organic filler but the worse influence is given to the transparency of the coating. Therefore, when an inorganic filler of 0.5 μm or less in particle diameter is contained in the light transmissive resin 16 to a degree of less than 0.1 wt % so that the transparency of the coating is not impaired, the sedimentation can be prevented.

In case of adding no inorganic filler which is a sedimentation preventingagent for preventing sedimentation of the organic filler, since the organic filler is sedimented at the bottom, it is sufficient to well stir it up to be uniform to use it when applying it to the transparent base film 12.

Hereupon, an ionizing-radiation hardening resin is generally about 1.5 in refractive index nearly to the same degree as glass, but in case that a resin to be used is too lower in refractive index in comparison with said light transmissive diffusing material 14, it can be adjusted by increasing its refractive index through adding such fine particles being high in refractive index as $TiO_2$ (2.3 to 2.7 in refractive index), $Y_2O_3$ (1.87 in refractive index), $La_2O_3$ (1.95 in refractive index), $ZrO_2$ (2.05 in refractive index), $Al_2O_3$ (1.63 in refractive index) and the like to the said light transmissive resin 16 to such a degree as being capable of keeping the diffusibility of the coating film.

A low refractive index layer 20 used in the present invention is composed of a silicon-containing vinylidene fluoride copolymer, and is concretely characterized by being a resin composition composed of a 100 weight portion of fluorine containing copolymer which is made by copolymerization of a monomer which contains vinylidene fluoride of 30 to 90 wt % and hexafluoropropylene of 5 to 50 wt % and whose content of fluorine is 60 to 70 wt %, and an 80 to 150 weight portion of polymerized compound having an ethylene unsaturated group. A low refractive index layer 20 which is a thin film of 200 nm or less in film thickness, is provided with a scratch resistance, and is less than 1.60 in refractive index (preferably less than 1.45) is formed by using this resin composition.

Said fluorine-containing copolymer used in this low refractive index layer 20 is a copolymer obtained by copolymerizing a monomer composition which contains vinylidene fluoride and hexafluoropropylene, and for percentage of each ingredient in the said monomer composition, vinylidene fluoride is 30 to 90 wt %, preferably 40 to 80 wt % and particularly preferably 40 to 70 wt %, and hexafluoropropylene is 5 to 50 wt %, preferably 10 to 50 wt % and particularly preferably 15 to 45 wt %. This monomer composition may further contain tetrafluoroethylene of 0 to 40 wt %, preferably 0 to 35 wt % and particularly preferably 10 to 30 wt %.

And a monomer composition for obtaining this fluorine-containing copolymer may contain another copolymer component, for example, of 20 wt % or less and preferably 10 wt % or less within a range where an object and an effect of the present invention are not impaired. Hereupon, as a concrete example of the said other copolymer, for example, can be mentioned a polymeric monomer having fluoride atoms such as fluoroethylene, trifluoroethylene, chlorotrifluoroethylene, 1, 2-dichloro-1, 2-difluoroethylene, 2-bromo-3, 3, 3-trifluoroethylene, 3-bromo-3, 3-difluoropropylene, 3, 3, 3-trifluoropropylene, 1, 1, 2-trichloro-3, 3, 3-trifluoropropylene, α-trifluoromethacryl acid, and the like.

A fluorine-containing copolymer obtained from such a monomer composition needs to have the content of fluorine of 60 to 70 wt %, preferably 62 to 70 wt % and particularly preferably 64 to 68 wt %.

This fluorine-containing copolymer has a good dissolubility to solvents described later thanks to its content of fluorine being within a specific range as described above. And since a film which has an excellent adhesion to various base materials, a high transparency and a low refractive index, and has a sufficiently excellent mechanical strength is formed by containing such a fluorine-containing copolymer as a component, this is very preferable thanks to being capable of providing a sufficiently high mechanical performance such as a scratch resistance of the surface of a base material and the like.

This fluorine-containing copolymer is preferably 5,000 to 200,000 in the average molecular weight calculated in terms of polystyrene, and particularly preferably 10,000 to 100,000. A fluorine-containing resin composition obtained by using a fluorine-containing copolymer having a molecular weight of such size becomes preferable in viscosity, and it is possible to surely obtain a fluorine-containing resin composition having a preferable coating ability.

Furthermore, a fluorine-containing copolymer itself is preferably 1.45 or less in refractive index, particularly preferably 1.42 or less and still further preferably 1.40 or less. In case of using a fluorine-containing copolymer exceeding 1.45 in refractive index, a thin film formed out of the obtained fluorine-containing coating material may be small in antireflection effect.

A polymeric compound used in the present invention is a compound having an ethylene unsaturated group generating an additional polymerization by being irradiated with active energy beams under existence or nonexistence of a photopolymerization initiator, or by being heated under existence of a thermal polymerization initiator.

As a concrete example of such a polymeric compound, for example, a compound mentioned in Japanese Patent Laid-Open Publication No. Hei 8-94806 can be used.

Among these compounds, dipentaerythritol hexa(meth)acrylate, pentaerythritol tetra(meth)acrylate, dipentaerythritol penta(meth)acrylate, and caprolactone denatured dipentaerythritol hexa(meth)acrylate are particularly preferable.

In case that a polymeric compound to be used contains three or more ethylene unsaturated groups in its single molecule, a fluorine-based resin composition obtained results in a compound capable of forming a thin film being very excellent in adhesion to a base material and in mechanical performance such as scratch resistance and the like of the surface of the base material.

The amount of the polymeric compound used to 100 weight parts of the fluorine-containing copolymer is 30 to 150 weight parts, preferably 35 to 100 weight parts and particularly preferably 40 to 70 weight parts.

When this ratio of the polymeric compound used is too small, a thin film formed by the obtained coating material comes to be low in adhesion to a base material, and on the other hand, when this ratio of it is too large, a formed film comes to be so high in refractive index as to make it difficult to provide a good antireflection effect.

In said fluorine-based resin composition, the ratio of the contained fluorine to the sum of the fluorine-containing copolymer and a polymer-forming component including the polymeric compound is preferably 30 to 55 wt % and particularly preferably 35 to 50 wt %. In case that such a condition is satisfied, a thin film which attains more sufficiently an object and an effect of the present invention can be surely formed. A thin film formed out of a fluorine-based resin composition containing too much fluorine is liable to be low in adhesion to a base material and be slightly low in mechanical performance such as a scratch resistance and the like, and on the other hand, a thin film formed out of a fluorine-based resin composition containing too little fluorine is liable to be high in refractive index to degrade its antireflection effect.

A low refractive index layer 20 of the present invention is composed of a silicon-containing vinylidene fluoride polymer, and the silicon and fluorine can improve the contamination preventing ability and the scratch resistance of the surface of the layer, and the silicon can suppress deterioration in physical properties of the low refractive index layer 20 which a saponification process described later has been applied to.

In said non-glare film, since the low refractive index layer 20 is formed out of a resin composition composed of 100 weight parts of a fluorine-containing copolymer having fluorine of 60 to 70 wt % in its content and being formed by copolymerization of a monomer composition which contains vinylidene fluoride of 30 to 90 wt % and hexafluoropropylene of 5 to 50 wt %, and 30 to 150 weight pats of a polymeric compound having an ethylene unsaturated group, and particularly its fluorine-containing copolymer contains a monomer component of hexafluoropropylene of 5 to 50 wt %, a low refractive index of 1.45 or less can be realized in a low refractive index layer formed by application of this resin composition, and particularly, since the fluorine-containing copolymer contains a monomer component of vinylidene fluoride of 80 to 90 wt %, an obtained resin composition can be enhanced in solvent dissolubility and can be improved in coating ability, and can be formed into a thin film being 200 nm or less in film thickness so as to be suitable for preventing reflection.

Additionally, since the resin composition to be applied contains 30 to 150 weight parts of a polymeric compound having an ethylene unsaturated group, an obtained coating film comes to be excellent in mechanical strength of scratch resistance. And since each of the resin components is high in transparency, a low refractive index layer 20 formed out of a resin composition containing these components is excellent in transparency.

In said non-glare film 10, since from the air being in contact with it to its inside there are an air layer (1.0 in refractive index), a low refractive index layer 20 (less than 1.60 and preferably 1.45 or less in refractive index), a non-glare layer 18 (1.50 or more in refractive index) and a transparent base film 12 (lower than or nearly equal to the non-glare layer 18 in refractive index), it can perform an efficient antireflection action. It is preferable that the non-glare layer 18 is higher in refractive index than the transparent base film 12, and in such a case an effect of preventing reflection in the interface between the transparent base film 12 and the non-glare layer 18 is further added.

A solvent used in said low refractive index layer 20 has preferably a boiling point within a range from 50 to 200° C. under a pressure of 760 hpa from a viewpoint of the coating ability of the said fluorine-based resin composition and the adhesion of a formed thin film to the base material.

As concrete examples of such a solvent, for example, can be mentioned solvents composed of a kind of ketone or a kind of ester carboxylate, such as acetone, diethyl ketone, dipropyl ketone, methyl ethyl ketone, methyl butyl ketone, methyl isobutyl ketone, cyclohexanone, methyl formate, ethyl formate, propyl formate, isopropyl formate, butyl formate, methyl acetate, ethyl acetate, propyl acetate, isopropyl acetate, butyl acetate, isobutyl acetate, butyl(II) acetate, amyl acetate, isoamyl acetate, amyl(II) acetate, methyl. propionate, ethyl propionate, methyl butyrate, ethyl butyrate, methyl lactate and the like. These solvents may be composed of either a single component or a mixture of two or more components, and furthermore a solvent other than the solvents exemplified above may be added within a range where the performance of the resin composition is not impaired.

The amount of a solvent used to 100 weight parts of the sum of the fluorine-containing copolymer and the polymeric compound is ordinarily 200 to 10,000 weight parts, preferably 1,000 to 10,000 weight parts and particularly preferably 1,200 to 4,000 weight parts.

By limiting the amount of a solvent used to this range, it is easy to keep the viscosity of a fluorine-based resin composition in a range of 0.5 to 5 cps (25° C.) and particularly 0.7 to 3 cps (25° C.) where a preferable coating ability as a resin composition can be obtained. As a result, a thin film of 100 to 200 nm in thickness which is practically preferable and uniform without coating irregularity as an antireflection film for visible light can be easily formed out of the said fluorine-based resin composition, and furthermore a thin film being particularly excellent in adhesion to a base material can be formed.

A fluorine-based resin composition used in an optical-functionality film of the present invention is hardened by polymerization of ethylene unsaturated groups in a plymeric compound contained in it, and therefore, a solid thin film is formed by applying a hardening process for polymerizing the said polymeric compound to a coating film formed by application of the said resin composition.

As a means for such a hardening process, a means of irradiating a coating film of the said fluorine-based resin composition with active energy beams or a means of heating the coating film is utilized, and thereby since a hardened thin film which the present invention aims at can be surely and easily formed, this is very advantageous in practical use and convenient also in a thin film forming operation.

In case of applying a hardening process by irradiation of active energy beams to a fluorine-based resin composition used in an optical-functionality film of the present invention, when using electron beams as the active energy beams, a desired hardening process can be performed without particularly adding a polymerization initiator to the said fluorine-based resin composition.

And in case of using light rays such as ultraviolet rays or visible light rays as active energy beams for a hardening process, a photo-polymerization initiator which is decomposed to generate, for example, radials by receiving irradiation of the said active energy beams and thereby initiates polymerization of a polymeric compound is added to the fluorine-based resin composition.

A concrete example of such a photo-polymerization initiator has been disclosed in the above-mentioned Japanese Patent Laid-Open Publication No. Hei 8-94806, and is preferably 1-hydroxyl cyclohexyl phenyl ketone, 2-methyl-1-<4-(methylthio)phenyl>-2-morpholinopropane-1-one, 2-(dimethylamino)-1-<4-(morpholinyl) phenyl>-2-phenylothyl)-1-butanone or the like. Furthermore, in case of utilizing a heating means for a hardening process, a thermal polymerization initiator which generates, for example, radicals by heating and initiates polymerization of a polymeric compound is added to a fluorine-based resin composition.

As concrete examples of a thermal polymerization initiator, can be mentioned, for example, benzoyl peroxide, tert-butyl-oxybenzoate, azobisisobutyronitrile, acetyl peroxide, auril peroxide, tert-butyl peracetate, cumil peroxide, tert-butyl peroxide, tert-butyl hydroperoxide, 2, 2'-azobis(2, 4-dimethyl valeronitryl), 2, 2'-azobis(4-methoxy-2, 4-dimethyl valerontryl) and the like.

The amount of a photo-polymerization initiator or a thermal polymerization initiator added to said fluorine-based resin composition to 100 weight parts of the sum of the fluorine-containing copolymer and the polymeric compound is ordinarily 0.5 to 10 weight parts, preferably 1 to 8 weight parts and particularly preferably 1 to 3 weight parts. When this amount of an initiator added exceeds 10 weight parts, this may have a bad influence on handling of the resin composition and the mechanical strength and the like of a formed thin film, and on the other hand, the amount of an initiator added being less than 0.5 weight parts makes the hardening speed small.

Within a range where an object and an effect of the present invention are not impaired, according to need, to said fluorine-based resin composition, can be added various kinds of additive agents, for example, a sensitizer or a polymerization accelerator composed of an amine-based compound such as triethanolamine, methyldiethanolamine, triethylamine, diethylamine and the like; a polymer or an oligomer such as an epoxy resin, a polyamide resin, a polyamide-imideresin, a polyurethane resin, a polybutadiene resin, a polychloroprene resin, a polyether resin, a polyester resin, a styrene-butadiene styrene block copolymer, a petroleum resin, a xylene resin, a ketone resin, a silicone-based oligomer, a polysulfide oligomer and the like; a polymerization inhibitor such as phenothiazine, 2, 6-di-tert-butyl-4-methyl phenol and the like; and additionally to these, a leveling agent, a leakage improver, a surface-active agent, a plasticizer, an ultraviolet absorber, a silane coupling agent, an inorganic filler, resin particles, pigment, dye and the like.

The antireflection effect of a low refractive index layer has been described above, and the low refractive index layer has also an effect of improving the back density and bringing a high contrast, and its preferable embodiment is the same as described above.

A method of forming said low refractive index layer 20 may be another general thin film forming method, for example, a proper means such as a vacuum deposition method, a sputtering method, an ion-plating method, an electroplating method and the like, and the layer 20 may be formed by means of a coating film of an antireflection coating material other than said materials, a very thin film of MgF2 and the like or a metal-deposited film of about 0.1 μm in film thickness, or an SiOx-deposited or MgF2-deposited film.

As described above, in case that a light transmissive diffusing resin 16 having a refractive index higher enough than the refractive index of a material selected for the low refractive index layer 20 cannot be obtained, it is adjusted as increasing its refractive index by adding fine particles being high in refractive index such as TiO2 and the like as described above into the light transmissive resin.

Figure 2:
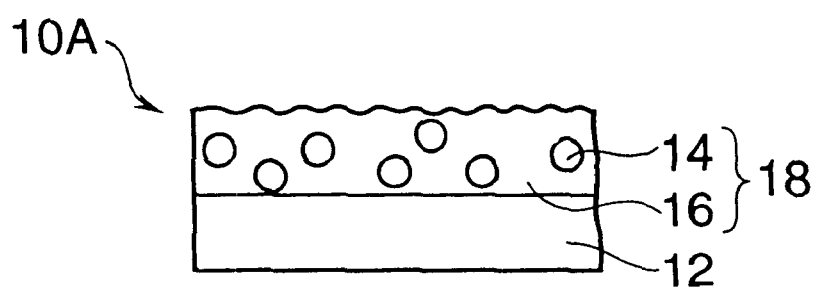
FIG. 2 a sectional view showing a non-glare film according to a second embodiment of the same.

The non-glare film 10 shown in FIG. 1 is provided with a low refractive index layer, but the present invention is not limited to this and accepts also a non-glare film provided with no low refractive index layer like a non-glare film 10A of a second embodiment shown in FIG. 2.

Figure 3:
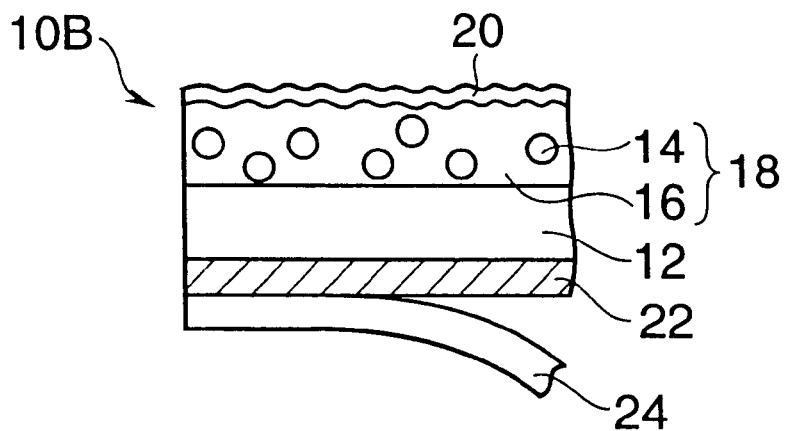
FIG. 3 is a sectional view showing a non-glare film according to a third embodiment of the same.

And a non-glare film may be also provided with a low refractive index layer 20, an adhesive layer 22 and a separator 24 like a non-glare film 10B of a third embodiment shown in FIG. 3.

The adhesive layer 22 provided on the opposite side of said transparent base film 12 to the non-glare layer 18 is used in case of attaching the non-glare film 10 onto a liquid crystal panel for example, and the non-glare film 10 can be attached by pressing the adhesive layer 22 exposed by exfoliating the separator 24 onto a liquid crystal panel and the like.

Figure 4:
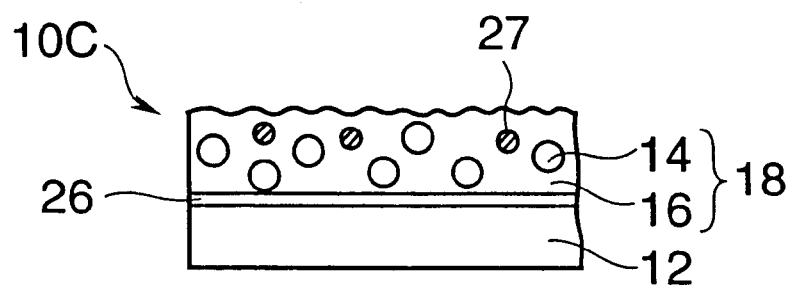
FIG. 4 is a sectional view showing a non-glare film according to a fourth embodiment of the same.

And like a non-glare film 10C of a fourth embodiment shown in FIG. 4, an electrification preventing ability can be given by providing a transparent conductive layer 26 between a transparent base film 12 and a non-glare layer 18, and further making the non-glare layer 18 contain a conductive material 27.

Such an electrification preventing ability can be given to every non-glare film (including non-glare films in a polarizing device and a display device described later) of each embodiment of the present invention by providing a transparent conductive layer.

The transparent conductive layer 26 is formed by dispersing conductive fine particles into a resin composition, and as the conductive fine particles, for example, antimony-doped indium-tin oxide (hereinafter referred to as ATO) particles, indium-tin oxide (ITO) particles, organic fine particles surface-treated with gold and/or nickel, and the like can be used; and as a resin composition, a resin containing an alkyd resin, an oligomer or prepolymer of (meth)acrylate (hereinafter in this specification, acrylate and methacrylate are represented as (meth)acrylate of multifunctional compounds such as polyhydric alcohol and the like, and a comparatively large amount of reactive diluent can be used.

As a conductive material 27 to be contained in the non-glare layer 18, particles surface-treated with gold and/or nickel can be used. Particles before receiving such a surface treatment can be selected from a group of silica, carbon black, metal particles and resin particles.

Since the other components of the non-glare films 10A, 10B and 10C of FIGS. 2 to 4 are the same as those of said non-glare film 10, the same symbols are given to the same components and description of them is omitted.

Figure 5:
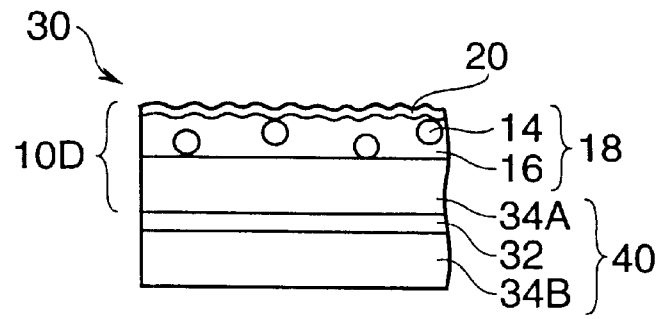
FIG. 5 is a sectional view showing a first embodiment of the present invention related to a polarizing device.

Next, a first embodiment of the present invention with respect to a polarizing device shown in FIG. 5 is described.

As shown in FIG. 5, a polarizing plate 30 according to this embodiment has a non-glare film 10D similar to said non-glare film 10, and a polarizing film 32 laminated onto the opposite surface of a TAC film 34A to the non-glare layer 18, said TAC film 34A being a transparent base film in this non-glare film 10D. This polarizing film 32 is composed of a film obtained by adding iodine or dye to polyvinyl alcohol (PVA) and extending it.

Moreover, a TAC film 34B is provided on the lower side of said polarizing film 32 in FIG. 5.

A polarizer 40 is formed in a state where the polarizing film 32 is held between the TAC film 34B and said TAC film 34A.

Since the TAC forming a transparent base material has no double refraction and does not disorder a polarized light, when it is laminated onto a PVA film and a PVA+iodine film a polarized light is not disordered. Therefore, a liquid crystal display device being excellent in display quality can be obtained by using a polarizing plate 30 as described above.

As a polarizing material for forming such a polarizing film 32 as described above, in addition to said PVA film, a polyvinyl formal film, a polyvinyl acetal film, an ethylene-vinyl acetate copolymer-based saponified film and the like can be also used.

Figure 6:
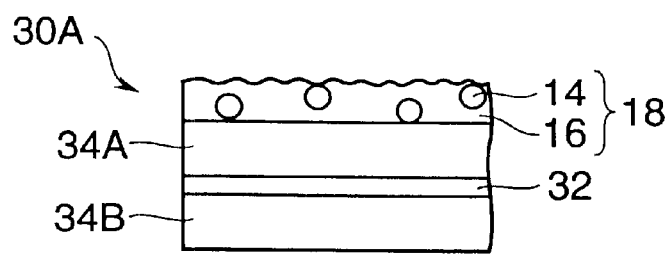
FIG. 6 is a sectional view showing a polarizing device according to a second embodiment of the same.
Figure 7:
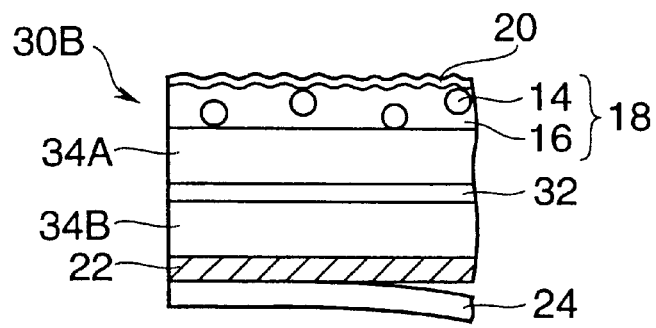
FIG. 7 is a sectional view showing a polarizing device according to a third embodiment of the same.

Moreover, a polarizing plate 30A obtained as shown in FIG. 6 by removing a low refractive index layer from said polarizing plate 30 or a polarizing plate 30B obtained as shown in FIG. 7 by providing a low refractive index layer 20, an adhesive layer 22 and a separator 24 on said polarizing plate 30 may be also used.

When laminating the polarizing film 32 and the TAC films 34A and 34B to one another, in order to enhance adhesion and prevent static electricity, it is preferable to perform a saponification process on said TAC films. Such a saponification process makes the surfaces of the TAC films hydrophilic to improve the adhesion to a PVA film.

When a saponification process has been applied to a TAC film, in case of using, for example, a thin film of SiOx as a material for said low refractive index layer 20, a problem occurs in a point of a contamination preventing ability and a saponification preventing ability, but in this case, it is sufficient that after performing a saponification process on the non-glare layer 18 a low refractive index layer 20 is formed by an SiOx vacuum deposition or sputtering method and the like and then a layer of a contamination preventing material is formed on it.

Figure 8:
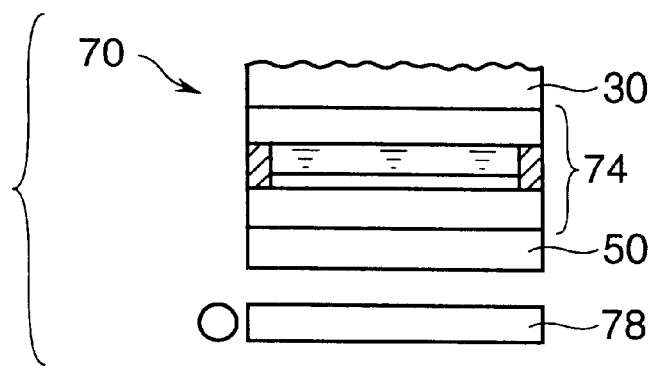
FIG. 8 is a sectional view showing a first embodiments case that a display device of the present invention is a liquid crystal display device.
Figure 9:
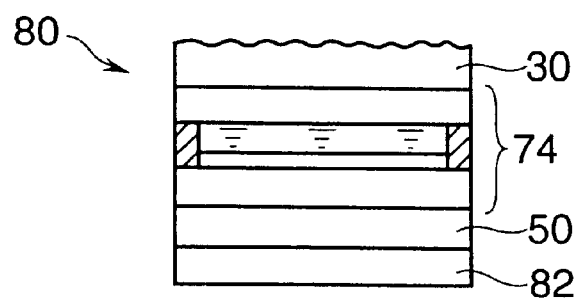
FIG. 9 is a sectional view showing a second embodiment of the same.
Figure 10:
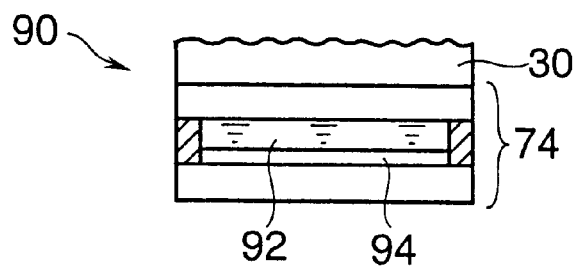
FIG. 10 is a sectional view showing a third embodiment of he same.

Next, embodiments in case of applying a display device according to the present invention shown in FIGS. 8 to 10 to a liquid crystal display device are described.

A liquid crystal display device 70 shown in FIG. 8 is of a transmission type, and is formed by laminating a polarizing plate 30, a liquid crystal panel 74 and a polarizer 50 to one another in this order, and arranging a back light 78 at the back of the polarizer 50. As the polarizer 50, a polarizer used in an ordinary liquid crystal display device can be used.

FIG. 9 shows a reflection type liquid crystal display device 80 of an externally attached reflecting plate type which the present invention is applied to. In this liquid crystal display device 80, a reflecting plate 82 is arranged so as to be adhered closely to the polarizer 50 instead of the backlight in said liquid crystal display device 70.

FIG. 16 shows a reflection type liquid crystal display device 90 of an internal reflecting electrode type which the present invention is applied to.

In this liquid crystal display device 90, a reflecting electrode 94 serving also as an electrode of a reflecting plate is disposed in a liquid crystal cell 92 of a liquid crystal panel 74, and the polarizer 50 and the reflecting plate 82 in the liquid crystal display device 80 of FIG. 10 are not provided.

A liquid crystal mode used in the liquid crystal panel 74 in said liquid crystal display devices 70, 80 and 90 may be any of a twist-nematic type (TN), a supertwist-nematic type (STN), a guest-host type (GH), a phase conversion type (PC) and a polymer dispersion type (PDLC) and the like.

And a driving mode of a liquid crystal panel may be any of a simple matrix type and an active matrix type, and in case of an active matrix type, a driving method of TFT, MIM or the like is used.

Furthermore, a liquid crystal panel 74 may be any of a color type and a monochrome type.

Still further, the present invention can be also applied to display devices other than a liquid crystal display device, for example, a plasma display device and a CRT display device.

Next, examples of the present invention are described.

Table 1 shows a result of observing non-glare films of the examples 1 to 6 according to the present invention and comparative examples 1 to 10 according to the prior art for comparison and a result of evaluating low refractive index layers (examples 3 to 6 and comparative examples 6 to 10 have no low refractive layer) in saponification preventing ability. Examples 7 (described later) is not shown in Table 1.

TABLE 1

| | Internal haze | Surface haze | Reflectivity (%) | Face-glare | Reflecting-in | Black density (measurement) | Contact angle (°) | Initial steel wool | After saponification Reflectivity (%) | After saponification Contact angle (°) | After saponification Steel wool |
|---|---|---|---|---|---|---|---|---|---|---|---|
| Examples | | | | | | | | | | | |
| 1 | 7 | 19 | 0.8 | No | No | Good (2.15) | 103 | ○ | 0.8 | 102 | ○ |
| 2 | 5 | 25 | 0.8 | No | No | Good (2.01) | 101 | ○ | 0.8 | 100 | ○ |
| 3 | 9 | 20 | 0.3 | No | No | Good (2.04) | 107 | ○ | — | — | — |
| 4 | 7 | 19 | — | No | No | Good (2.15) | 103 | ○ | — | — | — |
| 5 | 5 | 25 | — | No | No | Good (2.01) | 101 | ○ | — | — | — |
| 6 | 9 | 20 | — | No | No | Good (2.04) | 107 | ○ | — | — | — |
| Comparative Examples | | | | | | | | | | | |
| 1 | 0.7 | 30 | 1.0 | Yes | No | Good (1.94) | 101 | ○ | 1.0 | 101 | ○ |
| 2 | 1 | 14 | 1.5 | Yes | Yes | Good (2.14) | 103 | ○ | 1.5 | 102 | ○ |
| 3 | 0.3 | 25 | 0.8 | Yes | No | Good (1.96) | 103 | ○ | 0.8 | 101 | ○ |
| 4 | 3 | 47 | 0.5 | No | No | Whitish (1.40) | 100 | ○ | 0.5 | 100 | ○ |
| 5 | 9 | 3 | 1.5 | No | Yes | Good (2.16) | 104 | ○ | — | — | — |
| 6 | 0.7 | 30 | — | Yes | No | Good (1.94) | 101 | ○ | — | — | — |
| 7 | 1 | 14 | — | Yes | Yes | Good (2.14) | 103 | ○ | — | — | — |
| 8 | 0.3 | 25 | — | Yes | No | Good (1.96) | 103 | ○ | — | — | — |
| 9 | 3 | 47 | — | No | No | Whitish (1.40) | 100 | ○ | — | — | — |
| 10 | 9 | 3 | — | No | Yes | Good (2.16) | 104 | ○ | — | — | — |

From this Table 1, it is seen that in case that the surface haze value is small the reflectivity is large and the reflecting-in is intense, and in case that the internal haze value small the face-glare is liable to occur.

And it is seen that in case that the surface value is large and the sum of the surface value and the internal haze value is large, the black density is lowered to make the display whitish. If the black density is lowered, the contrast is degraded.

According to the examples of Table 1 described above and a result of other experiments by the inventors, in case that the surface haze value hs of a non-glare layer met "7<hs<30" and the internal haze value hi of it met "1<hi<15", there is no face-glare nor reflecting-in and the black density became better to bring a high contrast.

Furthermore, it has been confirmed that in case that the sum of the surface haze value and the internal haze value exceeds 30, the black density is lowered to make the display whitish.

And a better black density, a higher contrast and a better antireflection effect can be also obtained by providing a low refractive index layer on the surface of a non-glare layer.

Table 2 shows the conditions for implementing said examples 1 and 2.

TABLE 2

| | Example 1 | Example 2 |
|---|---|---|
| Non-glare layer | | |
| PETA (product name PET30; Nippon Kayaku) | 3.04 g | 1.97 g |
| Styrene beads paste (product name SX-130; Soken Kagaku) | 1 g | 0.5 g |
| 10% CAP (diluted with ethyl acetate) | 3.64 g | 2.27 g |
| Solvent   Toluene, butyl acetate, isobutyl alcohol | 7.21 g | — |
| Toluene, butyl acetate | — | 4.38 g |
| Photo-hardening initiator (product name IllugaCure 651; Chiba Geigy) | 0.11 g | 0.06 g |
| P/V ratio | 10/100 | 8/100 |
| Low | | |
| 10% silicon-containing vinylidene fluoride (product name TM004; JSR) | 2 g | 2 g |
| 10% DPHA (diluted with MIBK) | 0.86 g | 2 g |
| Solvent   MIBK | 11.44 g | 16 g |

TABLE 2-continued

|  | Example 1 | Example 2 |
| --- | --- | --- |
| Photo-hardening initiator IllugaCure 651; Chiba Geigy) | 0.001 g | 0/002 g |

In Table 2, PETA is pentaerythritol triacrylate, CAP is cellulose acetate propionate, and in Table 2, "10% CAP" means CAP containing the polymer of 10% in a state where it is diluted with ethyl acetate. "10%" in "10% silicon-containing vinylidene fluoride" and "10% DPHA" means also the same.

And DPHA is dipentaerythritol hexacrylate, and a solvent MIBK for diluting this represents methyl isobutyl ketone.

And P/V represents a filler/binder, and styrene beads paste (product name SX-130H) means "paste of styrene beads and PETA at a ratio of 4:6", and the content of beads is 40%.

And in Table 1, the contact angle is an angle made between a tangential line of a waterdrop on the surface of said low refractive index layer and the surface of the low refractive index layer, and the initial steel wool and the steel wool in the saponification preventing ability are the items for confirming a hard coating performance of the surface of a low refractive index layer by using a steel wool of #0000, scratching the surface at 20 times under a load of 200 g, and checking occurrence of scratches on the surface and variation in optical performance.

And a saponification test is performed after dipping a non-glare film in an alkali solution (NaOH of 2N) at 60° C. for one minute and then taking it out and washing it with cleansing water.

And in Table 1, the haze values were measured by means of a measuring instrument of product name HR-100 by Nurakami Color Technology Laboratory, and the reflectivity was measured by means of a spectroreflectometer MPC-3100 by Shimadzu Corporation and the average reflectivity with respect to light of 380 to 780 nm in wavelength was taken.

And the contact angle was measured by means of a contact angle measuring instrument Model G1 by Elmer, Inc., using pure water.

And as for evaluation of the face-glare, a face-glaring state was evaluated by eye after setting a color filter of lattice arrangement (of 150-$\mu$m pitch) on a backlight (LIGHTBOX45 by HAKUBA) and then adhering a non-glare film at a position distant by 160 $\mu$m from the surface of the color filter so that the non-glare treated face of the non-glare film looks upward.

As for evaluation of said black density, a test piece obtained by adhering a black insulating vinyl tape (of 37.5 mm in width by YAMATO) onto the reverse surface of a non-glare film was used and the surface of the test piece film was observed under a fluorescent lamp. Additionally, this test piece was measured by means of a Macbeth RD918 by Kollmorgen Instruments Corporation. In the same way, a transparent base film whose reverse surface was adhered with a black vinyl tape was measured, and this value was set as a reference value, namely, a black density of 100% (for example, 2.28 in case of TAC), and the case where the measurement value of a test piece is not less than 85% of this reference value was determined as acceptable.

And as for the reflecting-in, the reflecting-in state of a fluorescent lamp was observed by using a polarizing plate adhered with a non-glare film and darkening the background with Cross Nicol.

A method for manufacturing a non-glare film in the examples 1 and 2 is as follows.

First, the method applies a material for a non-glare film obtained under the conditions of Table 2 to a TAC base material, dries it at 60° C. for one minute, and then irradiates it with UV rays (ultraviolet rays) of 90 mJ to half-cure it, and thus makes a non-glare layer of 3 to 4 $\mu$m/2 in film thickness.

Next, the method applies a material for a low refractive index layer shown in Table 2 onto the obtained non-glare layer described above, dries it at 80#4 for one minute, and then irradiates it with UV rays of 500 mJ under a nitrogen-purging environment to completely cure it together with said non-glare layer. At this time the low refractive index layer is 0.1 $\mu$m/2 in film thickness.

Hereupon, the surface haze value and the internal haze value of said non-glare layer can be properly selected mainly according to the P/V ratio, the refractive index difference between P and V, the kind of solvent and the like.

Next, example 3 is described. Example 3 forms a non-glare layer similar to that of embodiment 1, applies a saponification process to it and then forms an SiO2 film of 0.1 $\mu$m in film thickness as a low refractive index layer on the non-glare layer by means of a deposition process, and further provides a contamination preventing layer on it. The condition for deposition of SiO2 is that the degree of vacuum is $4 \times 10^5$ Torr, the voltage is 8 kV and the current is 20 to 40 mA.

And the contamination preventing layer is a contamination preventing layer of about 5 nm in film thickness formed by applying a KP-801M (product name; by Shin-Etsu Chemical Co., Ltd.) which is diluted to 0.07% with a fluorine-based solvent PF5080 (product name; by 3M) to a sample and dries it at 80° C. for one minute.

Each of examples 4 to 6 omits a low refractive index layer from each of embodiments 1 to 3, and therefore has no saponification process.

Next, example 7 is described.

Although not described in Table 1, a manufacturing method in example 7 which provides a transparent conductive layer 26 and a conductive material 27 as shown in FIG. 4 is described. First, the method applies a material for the transparent conductive layer to a TAC base material so as to become 2 $\mu$m/2 in film thickness, dries it at 70° C. for one minute, and then irradiates it with UV rays (ultraviolet rays)of 54 mJ to half-cure it. As the material for the transparent conductive layer, a DA-12 ink (ATO-containing conductive ink; by Sumitomo Osaka Cement) was used. Next, the method applies a material for a non-glare layer onto this transparent conductive layer so as to be 3 to 4 $\mu$m/m2, dries it at 60° C. for one minute, and then irradiates it with UV rays of 90 mJ under a nitrogen-purging environment to half-cure it. The material for the non-glare layer is a material obtained by adding a conductive material Bright GNR4, 6-EH (gold-nickel coated resin beads; by Nippon Chemical Industrial Co.) by 0.005 g to the material used in embodiment 1. Furthermore, the method applies the material for the low refractive index layer shown in Table 2 onto this non-glare layer, dries it at 80° C. for one minute, and then irradiates it with UV rays of 500 mJ under a nitrogen-purging environment to completely cure it together with said tranparent conductive layer and non-glare layer.

Comparative example 1 used 2.27 g of PETA shown in Table 2 and 0.2 g of silica beads of n=1.45 in refractive index and 1 μm in particle diameter as a material for a non-glare layer, and used the same as said example 2 with respect to the other conditions.

And a low refractive index layer in comparative example 1 was the same as said embodiment, 2, and a manufacturing method for it was also the same as examples 1 and 2.

Next, comparative example 2 is described. Comparative example 2 used 13.50 g of the same PETA as that in said Table2, the same styrene beads paste as embodiment 1, 13.3 g of 10% CAP, 36.8 g of a solvent (toluene, butyl acetate and isobutyl alcohol), and 0.399 g of the same photo-hardening initiator as examples 1 and 2.

And a low refractive index layer in comparative example 2 is the same as embodiment 1, and a manufacturing method for it is the same as embodiments 1 and 2.

Next, comparative example 3 is described. As a material for a non-glare layer Comparative example 3, were used 10 g of the same PETA, 5 g of the same 10% CAP, 20 g of the same solvent (toluene, butyl acetate and isobutyl alcohol) as example 1, and 0.3 g of the same photo-hardening initiator as example 1.

And this comparative example used a matt PET (product name E130; by Diafoil) as a molding film and used the same as example 1 as a material for a low refractive layer.

First, the manufacturing method applies the material for the non-glare film to a TAC base material so as to be 3 to 4 μm/2 in film thickness, laminates it onto said matt PET, and then irradiates it with UV rays of 50 mJ to half-cure it.

Next, the method exfoliates said matt PET to form a finely rugged surface on the non-glare layer, coats it with the material for the low refractive index layer so as to be 0.1 μm/2, dries it at 80° C. for one minute, and then irradiates it with UV rays of 500 mJ under a nitrogen-purging environment to completely cure it together with said non-glare layer.

Next, comparative example 4 is described.

Comparative example 4 replaces the solvent for the non-glare layer in said example 2 with ethyl acetate amine, and uses the same as example 1 as the other conditions.

Next, comparative example 5 is described.

Comparative example 5 was the same as example 1 except that in a material for a non-glare layer the solvent in example 1 was replaced with only MIBK, and used also the same low refractive index layer and the same manufacturing method as example 1.

Each of comparative examples 6 to 10 omits a low refractive index layer from each of comparative examples 1 to 5. Next, comparison in effect of saponification of example 2 and comparative example 11 shown in Table 3 is described.

TABLE 3

|  | After saponification | | |
| --- | --- | --- | --- |
|  | Reflection angle (%) | Contact angle (°) | Steel wool |
| Example 2 | 0.8 | 100 | ○ |
| Comparative example 11 | 1.2 | 90 | × |

A non-glare layer in comparative example 11 uses the same condition as said example 2, a low refractive index layer uses a fluorine-based low refractive index polymer containing no silicon (product number TM005; JSR), and a manufacturing method for them is the same as examples 1 and 2. Example 2 uses a fluorine-based low refractive index polymer containing silicon, and as known from Table 3, an apparent difference in hardness after saponification occurs between both of them.

Table 4 shows comparison in an electrification preventing ability of example 7 with example 1. From Table 4, it is seen that example 7 is smaller in surface resistance (Δ/□), although example 7 is equivalent in the other performance to example 1.

Since a non-glare film of the present invention is composed as described above, it has an excellent effect that when it is attached onto the surface of a display panel it can suppress degradation in contrast and furthermore prevent face-glare, reflecting-in and whitening.

TABLE 4

|  | Surface resistance value |
| --- | --- |
| Example 1 | $10^{14}$ or more |
| Example 7 | $10^7$–$10^8$ |

What is claimed is:

1. A non-glare film which has a non-glare layer laminated onto at least one surface of a transparent base film, said non-glare layer comprising a light transmissive resin containing a light transmissive diffusing material having a different refractive index than the light transmissive resin, wherein a surface haze value hs on a rugged surface of the non-glare layer meets the relationship 7<hs<30, and an internal haze value hi by internal diffusion of said non-glare layer meets the relationship 1<hi<15.

2. A non-glare file according to claim 1, further having a low refractive index layer laminated onto said non-glare layer, said low refractive index layer having a lower refractive index than said non-glare layer.

3. A non-glare film according to claim 2, wherein said low refractive index layer is formed from a silicon-containing vinylidene fluoride copolymer.

4. A non-glare film according to claim 2, wherein said low refractive index layer is formed from a silicon-containing vinylidene fluoride copolymer, said silicon-containing vinylidene copolymer is a polymer composed of a fluorine-containing copolymer which is a copolymer of vinylidene fluoride and hexafluoropropylene having a fluorine content of 60 to 70 wt %, and a polymeric compound having an ethylene unsaturated group.

5. A non-glare film according to claim 2, wherein said low refractive index layer is formed from a silicon-containing vinylidene fluoride copolymer, said silicon-containing vinylidene copolymer is a polymer composed of a fluorine-containing copolymer which is a copolymer of vinylidene fluoride and hexafluoropropylene having a fluorine content of 60 to 70 wt %, and a polymeric compound having an ethylene unsaturated group, said low refractive index layer is formed by being coated with a coating film composed of at least said fluorine-containing copolymer and said polymeric compound having an ethylene unsaturated group and then being irradiated with active energy beams or being heated.

6. A non-glare film according to claim 2, wherein said low refractive index layer is formed from a silicon oxide film, and further comprising a contamination preventing layer formed on said low refractive index layer.

7. A non-glare film according to claim 1, wherein the sum of the surface haze value hs of the rugged surface of said non-glare layer and the internal haze value hi by internal diffusion in said non-glare layer is equal to or less than 30.

8. A non-glare film according to claim 1, wherein the difference $\Delta n$ in refractive index between the light transmissive resin and the light transmissive diffusing material in said non-glare layer meets the relationship $0.01 \leq \Delta n \leq 0.05$, and the average particle diameter d of the light transmissive diffusing material meets the relationship $0.01 \mu m \leq d \leq 5 \mu m$.

9. A non-glare film according to claim 1, wherein said light transmissive resin is at least one of a thermosetting resin and an ionizing-radiation hardening resin, and said light transmissive diffusing material comprises organic fine particles.

10. A non-glare film according to claim 9, wherein said organic fine particles are styrene beads.

11. A non-glare film according to claim 1, wherein said transparent base film is formed from one of a triacetate cellulose film and a polyethylene terephthalate film.

12. A non-glare film according to claim 1, wherein a transparent conductive layer is disposed between said transparent base film and said non-glare layer, and a conductive material is contained in said non-glare layer.

13. A polarizing plate comprising:
   a non-glare film according to claim 1; and
   a polarizer which is laminated onto another surface of said transparent base film opposite to said non-glare layer of the non-glare film so as to direct its obverse surface to said another surface to said non-glare layer side.

14. A polarizing plate according to claim 13, further comprising a low refractive index layer laminated onto said non-glare layer, said low refractive index layer having a lower refractive index than said non-glare layer.

15. A polarizing plate according to claim 13, wherein the sum of the surface haze value hs of the rugged surface of said non-glare layer and the internal haze value hi by internal diffusion in said non-glare layer is equal to or less than 30.

16. Polarizing plate according to claim 13, wherein the difference $\Delta n$ in refractive index between the light transmissive resin and the light transmissive diffusing material in said non-glare layer meets the relationship $0.01 \leq \Delta n \leq 0.5$, and the average particle diameter d of the light transmissive diffusing material meets the relationship $0.01 \mu m \leq d \leq 5 \mu m$.

17. A polarizing plate according to claim 13, which is formed by applying a saponification process to the another surface of said transparent base film, and then laminating a polarizer onto the another surface of said transparent base film.

18. A display device comprising:
   a display panel comprising a plurality of pixels and forming an image by each pixel transmitting or reflecting light; and
   a non-glare film according to claim 1 provided on a display surface of said display panel.

19. A display device according to claim 18, further comprising a low refractive index layer laminated onto said non-glare layer, said low refractive index layer having a lower refractive index than said non-glare layer.

20. A display device according to claim 18, wherein the sum of the surface haze value hs of the rugged surface of said non-glare layer and the internal haze value hi by internal diffusion in said non-glare layer is equal to or less than 30.

21. A display device comprising:
   a display panel comprising a plurality of pixels and forming an image by each pixel transmitting or reflecting light; and
   a polarizing plate provided on a display surface side of said display panel, said polarizing plate including a non-glare film according to claim 1.

22. A display device according to claim 21, further comprising a low refractive index layer laminated onto said non-glare layer, said low refractive index layer having a lower refractive index than said non-glare layer.

23. A display device according to claim 21, wherein the sum of the surface haze value hs of the rugged surface of said non-glare layer and the internal haze value hi by internal diffusion in said non-glare layer is equal to or less than 30.

* * * * *